Sept. 11, 1928. 1,684,146
C. T. RIPLEY
RAILWAY JOURNAL BEARING
Filed Dec. 24, 1925
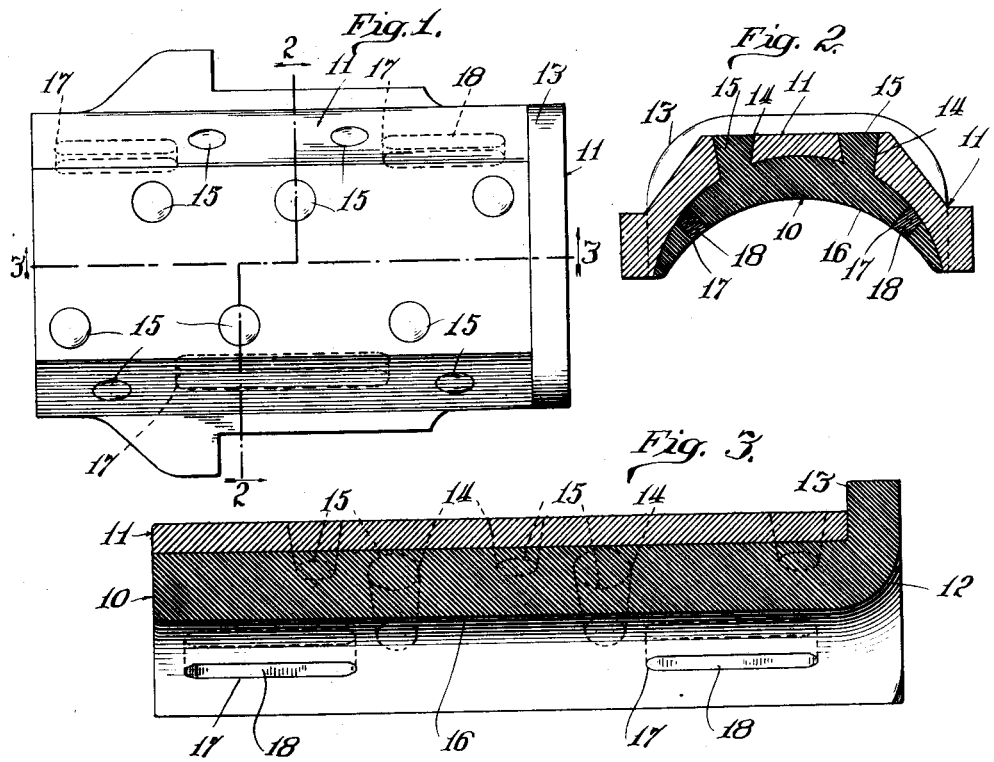

Patented Sept. 11, 1928.

1,684,146

UNITED STATES PATENT OFFICE.

CHARLES TRESCOTT RIPLEY, OF CHICAGO, ILLINOIS, ASSIGNOR TO S. & T. METAL COMPANY, OF CHICAGO, ILLINOIS, A CORPORATION OF ILLINOIS.

RAILWAY JOURNAL BEARING.

Application filed December 24, 1925. Serial No. 77,476.

My invention relates to journal bearings, and particularly to bearings for the axle journals of railway cars and locomotives. It has been usual to make such bearings of brass, usually lined with a relatively thin babbitt metal lining which is soldered to the brass body of the bearing. Although journal bearings so made have been used almost universally in railway service for many years, the bearings cannot be considered as free from serious and objectionable defects. It has been the primary purpose of my invention to overcome these defects and to provide a bearing, intended particularly for railway car and locomotive axle journals, which because of its quite radically different design and construction will serve its purpose much better than the type of bearings heretofore used.

The life of a babbitted brass journal bearing is short. The babbitt lining is thin so that in a relatively short time it wears down to the brass or cracks because of its brittleness. The melting point of babbitt is low (approximately 425° Fahrenheit) so that it melts rather quickly when the lubricant in the journal box is depleted. The destruction of the babbitt lining brings the bearing into contact with the brass body of the journal and this is likely to cut or score the journal involving serious loss. Hot boxes are not always discovered by the trainmen immediately after they develop and it is therefore necessary to have some protective shield left between the journal and the steel wedge after the antifriction lining metal has melted. This shield metal must have a considerably higher melting temperature than the lining metal and must be a bearing metal such as brass or aluminum.

In accordance with my invention the antifriction metal instead of being a mere lining, as is the case with the babbitt in the ordinary railway journal bearing, constitutes the main body of the bearing. Obviously babbitt metal cannot be used in this connection. It is too soft and lacking in tensile strength. The body portion of my improved journal bearing is made of a relatively tough, antifriction metal, but one having the necessary lubricating properties and of such hardness as to permit its seating itself on an undersized journal. Preferably I employ a lead base metal alloyed with small amounts of sodium and calcium together with certain other metals, in some cases, as will be hereinafter described. A lead alloy of this character will have the necessary strength and toughness at all normal temperatures but its melting point is low (although much higher than babbitt) being approximately 620° Fahrenheit, so that is the case of a hot box this portion of the bearing is likely to disintegrate. For this reason the body is covered or backed with a relatively thin cover plate or backing made of a metal having a much higher melting point than possessed by the antifriction metal. In case the anti-friction metal melts this cover plate will be left between the journal and the steel or iron wedge usual in journal boxes. The cover plate is preferably provided with means for lubricating its under surface to a certain extent when the contingency occurs. The cover plate might be made of brass but is more advantageously composed of aluminum or aluminum alloy for the reasons which will be described. Finally, the anti-friction metal body is provided with a body or bodies of a lubricating material which remain solid at normal temperature of the journal but which will melt at a temperature approximately the same as or slightly above the melting point of the anti-friction metal so as to coat the journal and prevent the melted anti-friction metal from freezing on said journal.

Other features and advantages of my improved journal bearing will be referred to in the following description of the preferred embodiment of the invention shown in the drawing in which Fig. 1 is a plan view of the bearing.

Fig. 2 is a cross sectional view thereof on line 2—2 of Fig. 1.

Fig. 3 is a longitudinal sectional view on line 3—3 of Fig. 1, the scale of Fig. 3 being enlarged, and Fig. 4 is a view, in perspective, of the bearing.

Referring to the drawing, 10 designates the body portion of the bearing consisting preferably of a lead base alloy, and 11 the cover plate or backing which is preferably made of aluminum alloyed as hereinafter specified. One end of the body portion 10 of the bearing is filleted as shown at 12 (Figs. 3 and 4) and provided with an upstanding rib 13. It is customary to form journal bearings with ribs of this sort but in the case of the babbitted brass bearing the rib is a part of the brass whereas in the bearing of my invention the rib forms a part of the anti-friction metal element of the bearing. This is of advantage because it adds strength to the anti-friction metal element where strength is particularly needed, that is, at the filleted end thereof. Moreover, the rib strengthens the anti-friction element of the bearing, transversely, as against the pressure of the journal when the brake shoes are set against the wheels.

The cover plate 11 is preferably made of aluminum or an aluminum alloy such, for example, as aluminum alloyed with 4% by weight of copper, 3% of silicon. There are several advantages in using aluminum rather than brass: Aluminum is a better conductor of heat so that the chances of the anti-friction element of the bearing becoming melted are diminished. Aluminum is lighter than brass and has all the strength necessary for the purpose for which it is used. The aluminum cover or backing plate may be die cast and does not have to be machined.

Preferably the anti-friction metal body of the bearing will have the following composition:

Sodium, 0.7% to 1.0%; calcium, 0.1% to 0.25%; tin, not less than 2%; aluminum, 0.05% to 0.1%; lead, to make up 100%.

The invention, however, is not limited to an anti-friction metal having this precise composition.

In practice the aluminum backing or cover plate is first cast either by die casting or otherwise and the anti-friction metal body is then cast against the under surface of the cover plate. This latter operation may be accomplished by die casting which is a cheaper and more expedient method than the soldering of babbitt linings to their brasses. Moreover, the bearing surface of the anti-friction metal element does not need to be machined as is the case with the babbitt lining. The surface can be made sufficiently true by the die casting operation, and, in any event, it will wear down to fit the journal before melting.

Preferably the cover plate is formed with a plurality of substantially circular perforations 14 which flare in the upward or outward direction. When the antifriction metal body is cast against the cover plate the antifriction metal will run into these openings forming studs or plugs 15 which have two functions: They serve to anchor the cover plate to the body of the bearing (one end of the plate being preferably abutted against rib 13); and they provide a certain amount of lubrication for the under surface of the cover plate in case the main body of the bearing should melt and become disintegrated at high temperature, or to a less extent, in case the bearing should wear down to the cover plate. It will be observed, however, that the anti-friction metal element of the herein disclosed bearing is very much thicker than the babbitt lining of the ordinary journal bearing and much less likely to crack so that the life of the bearing under ordinary conditions will be much longer than the life of the babbitt lined bearings besides which the anti-friction metal will be capable of better withstanding abnormal temperatures both because of its greater thickness and because of its higher melting point.

While aluminum may not be equal to brass in lubricating properties, this is compensated by the presence of the plugs of antifriction metal 15 which will melt but less readily than the main body of antifriction metal, and coat the under surface of the cover plate.

Preferably the bearing surface 16 of the antifriction metal body is formed with one or more recesses 17 (three are shown in staggered relation) and these recesses are filled with suitable bodies 18 of lubricating material which remain solid at normal temperatures of the journal but melt at a temperature approximate at or a trifle above the melting point of the antifriction metal. I preferably employ a graphite grease of known composition having a melting point of about 650° Fahrenheit. One example of a composition suitable for this purpose is composed of a heat-treated mixture of flake graphite, molasses and flour. When the temperature of the journal reaches the melting point of the antifriction metal the bodies of lubricant 18 will melt and cover the journal so that when the antifriction metal melts and disintegrates it will not freeze on the journal. The bodies of lubricant 18 are not intended to serve any purpose under normal conditions.

By the term "aluminum" as used in the claims I intend to use aluminum alloys such as specified. The term "lead base antifriction metal" includes any and all metals consisting principally of lead but alloyed with small amounts of other substances as given in the above illustrative examples.

As my invention is susceptible of various modifications it is my intention to cover by patent all variations within the scope of the appended claims.

I claim:

1. A journal bearing the body of which is composed of an anti-friction metal alloy of sufficient tensile strength at normal temperatures to withstand the stresses on the bearing and which has a surface portion shaped for contact with the journal of uniform composition with the rest of said body, in combination with a cover plate composed of metal having a higher melting point than the anti-friction metal body, the bearing face of said anti-friction metal body being recessed and the recess filled with a material of a lubricating character having a melting point approximately the same as the melting point of the anti-friction metal whereby in case the anti-friction metal body melts, the journal will be coated with said lubricating material to prevent freezing of the anti-friction metal to the journal.

2. A journal bearing the body of which is composed of lead alloyed with a hardening agent to give said body sufficient tensile strength, at normal temperatures, to withstand the stresses on the bearing and is provided with a surface portion shaped for contact with the journal of uniform composition with the rest of said body, in combination wtih a cover plate relatively thin with respect to the thickness of the lead alloy body, secured to said body so as to form a unitary structure therewith and composed of metal having a higher melting point than the lead alloy, the bearing surface of said journal bearing being recessed and the recess filled with material of a lubricating character having a melting point approximately that of the melting point of the lead alloy, whereby in case the body of the bearing melts the lubricating material will coat the journal and prevent freezing of the lead alloy thereto.

CHARLES TRESCOTT RIPLEY.